United States Patent
Rydnell et al.

(10) Patent No.: US 6,519,469 B1
(45) Date of Patent: Feb. 11, 2003

(54) UPLINK DETECTION OF SCHEDULE MOBILES FOR AVOIDING ACCESS DELAYS

(75) Inventors: Gunnar Rydnell, Rävlanda (SE); Jan Lindskog, Pixbo (SE); Timo Pohjanvuori, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/347,022

(22) Filed: Jul. 2, 1999

(51) Int. Cl.[7] .................................................. H04B 7/00
(52) U.S. Cl. ........................................ 455/466; 370/349
(58) Field of Search ................................. 370/348, 349, 370/355, 352, 311; 455/466, 455, 450, 452, 574

(56) References Cited

U.S. PATENT DOCUMENTS

| | | |
|---|---|---|
| 5,539,748 A | 7/1996 | Raith |
| 5,673,259 A | 9/1997 | Quick, Jr. |
| 5,708,656 A | 1/1998 | Noneman et al. |
| 5,802,465 A * | 9/1998 | Hamalainen et al. ........ 455/403 |
| 6,249,681 B1 * | 6/2001 | Virtanen ...................... 370/349 |

FOREIGN PATENT DOCUMENTS

| | | | |
|---|---|---|---|
| EP | 0681406 A1 * | 8/1995 | ............ H04Q/7/24 |
| EP | 0 681 406 | 11/1995 | |
| EP | 0872982 A1 | 10/1998 | |
| WO | WO97/37504 | 10/1997 | |

\* cited by examiner

*Primary Examiner*—Thanh Cong Le
*Assistant Examiner*—Nick Corsaro (57) ABSTRACT

The present invention provides a method and system for reducing the delay of the transmission of packet data including storing, by a base station, data associated with a mobile station from a first packet data transaction. A packet for starting a second packet data transaction is received from a mobile station and the base station determines whether or not the packet has been correctly received. The base station correlates at least one field in the packet with the stored data. If the base station is able to identify the mobile station based on the correlation with the stored data, then the base station reserves a resource for transmission of a subsequent packet from the mobile station regardless of whether or not the packet has been correctly received.

21 Claims, 7 Drawing Sheets

UPLINK DETECTION OF SCHEDULE MOBILES FOR AVOIDING ACCESS DELAYS

RELATED APPLICATION

This application is related to U.S. patent application Ser. No. 09/347023, filed on even date herewith, the entire contents of which are herein incorporated by reference.

BACKGROUND

The present invention relates generally to radiocommunication systems and, more particularly, to techniques and structures for allowing a mobile telephone to quickly establish an uplink and downlink Medium Access Control transaction.

The growth of commercial communication systems and, in particular, the explosive growth of cellular radiotelephone systems worldwide, has compelled system designers to search for ways to increase system capacity and flexibility without reducing communication quality beyond consumer tolerance thresholds. Mobile calls for example, may be routed in a circuit switched fashion, a packet switched fashion, or some hybrid thereof. It has become increasingly desirable to couple and to integrate mobile cellular telephone networks, for instance a GSM network, to Internet protocol (IP) networks for call routing purposes. The routing of voice calls over IP networks is frequently termed "voice over IP" or, more succinctly, VoIP.

Packet-switched technology, which may be connection-oriented (e.g., X.25) or "connectionless" as in IP, does not require the set-up and tear-down of a physical connection, which is in marked contrast to circuit-switched technology. This reduces the data latency and increases the efficiency of a channel in handling relatively short, bursty, or interactive transactions. A connectionless packet-switched network distributes the routing functions to multiple routing sites, thereby avoiding possible traffic bottlenecks that could occur when using a central switching hub. Data is "packetized" with the appropriate end-system addressing and then transmitted in independent units along the data path. Intermediate systems, sometimes called "routers," stationed between the communicating end-systems make decisions about the most appropriate route to take on a per packet basis. Routing decisions are based on a number of characteristics, including: least-cost route or cost metric; capacity of the link; number of packets waiting for transmission; security requirements for the link; and intermediate system (node) operational status.

Figure 1A:
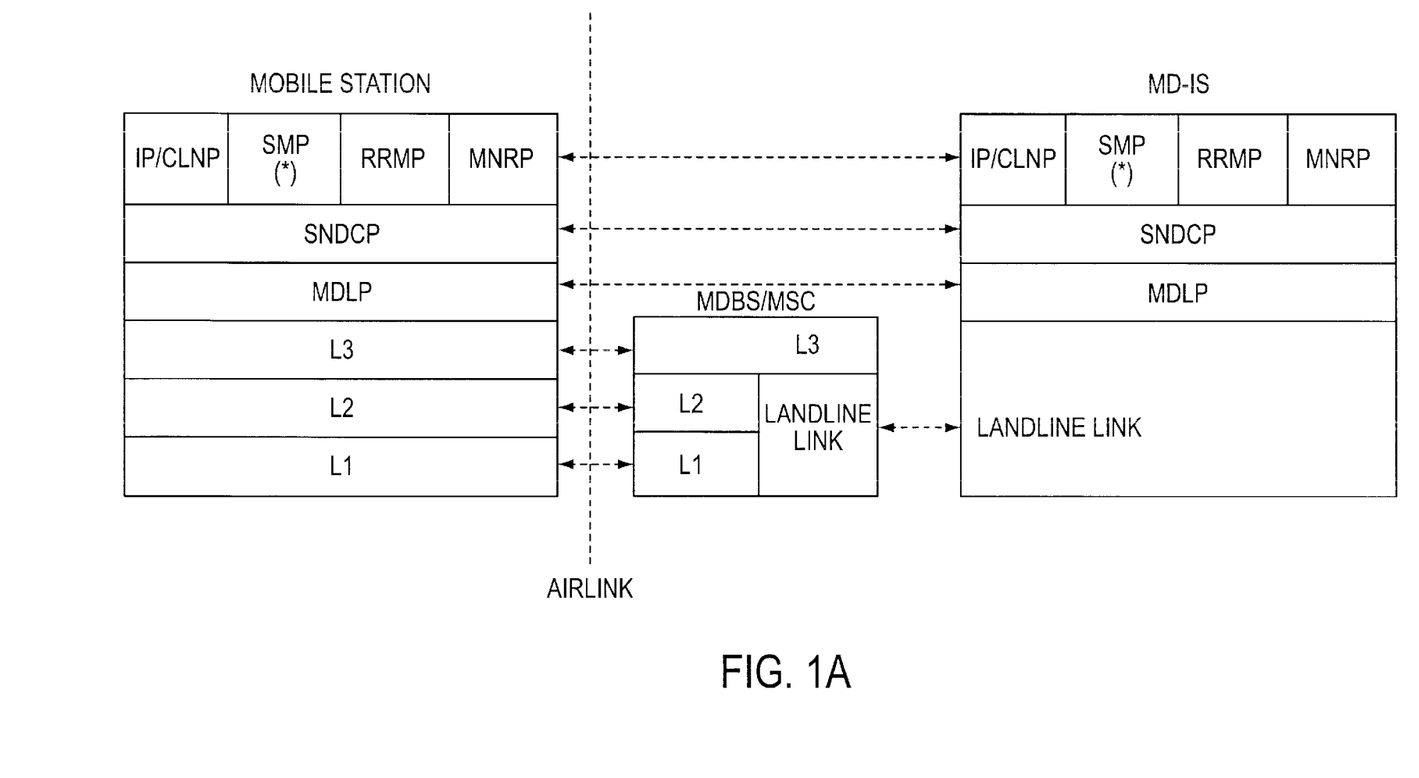
FIG. 1A illustrates a protocol architecture for communicating across an air link.

FIG. 1A shows representative architecture used for communicating across an air link that comprises the packet data protocols which provide connectivity between a mobile end system (M-ES), a mobile data base station (MDBS), and a mobile data intermediate system (MD-IS). An exemplary description of the elements in FIG. 1A and an approach for each element when considering alternative RF technologies follows.

The Internet Protocol/Connectionless Network Protocol (IP/CLNP) are network protocols that are connectionless and widely supported throughout the traditional data network community. These protocols are independent of the physical layer and preferably are not modified as the RF technologies change.

The Security Management Protocol (SMP) provides security services across the air link interface. The services furnished include data link confidentiality, M-ES authentication, key management, access control, and algorithm upgradability/replacement. The SMP should remain unchanged when implementing alternative RF technologies.

The Radio Resource Management Protocol (RRMP) provides management and control over the mobile unit's use of the RF resources. The RRMP and its associated procedures are specific to the AMPS RF infrastructure and require change based on the RF technology implemented.

The Mobile Network Registration Protocol (MNRP) is used in tandem with a Mobile Network Location Protocol (MNLP) to allow proper registration and authentication of the mobile end system. The MNRP should be unchanged when using alternative RF technologies.

The Mobile Data Link Protocol (MDLP) provides efficient data transfer between the MD-IS and the M-ES. The MDLP supports efficient mobile system movement, mobile system power conservation, RF channel resources sharing, and efficient error recovery. The MDLP should be unchanged when using alternative RF technologies.

The Medium Access Control (MAC) protocol and associated procedures control the methodology M-ESs use to manage shared access to the RF channel. This protocol and its functionality is supplied by alternative RF technologies.

Evolving packet data systems which use the aforementioned protocols will likely support two types of RF channels for packet data transmissions: a packet control channel (PCCH) and a packet traffic channel (PTCH). The PCCH may be either a point-to-point or point-to-multipoint channel. It is this channel on which a mobile station camps (i.e., where the mobile reads broadcast and paging information and where the mobile has random access and reserved access opportunities). The PTCH, on the other hand, is a point-to-point, reserved access only, channel. As will be appreciated by those skilled in the art, an RF channel can provide either packet data services or voice services or can simultaneously provide both packet data and voice services.

Figure 1B:
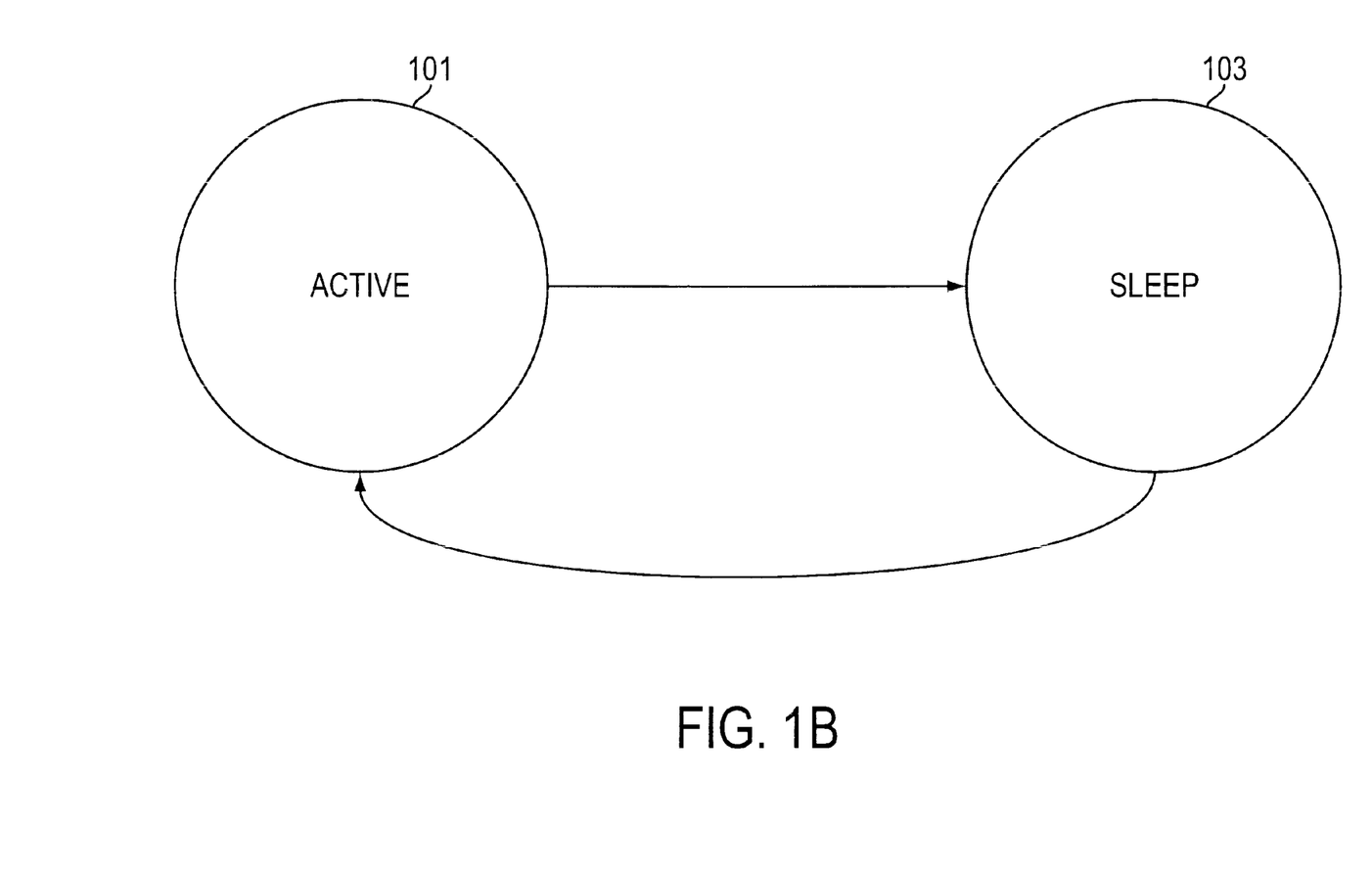
FIG. 1B illustrates a state diagram for a conventional mobile station.

FIG. 1B illustrates a state diagram for a conventional mobile station operating, for example, in the protocol architecture illustrated in FIG. 1A. Upon activation, a mobile station selects a PCCH on which to camp. If multiple PCCHs exist in a cell, then the mobile station selects one depending, for example, on the mobile station's identification. For instance, if the least significant bit of the mobile station's identification is 00, the mobile station will choose one PCCH; if the least significant bit is 01, it will choose another PCCH, etc. By selecting a PCCH in the above-described manner, paging traffic is spread out over the available PCCHs.

Upon a contention-based access from the mobile station, for the transmission of uplink data, or upon receiving mobile termination data from the network, for the transmission of downlink data, the network (via a base station) may direct the mobile station to tune to a specific PTCH for the establishment of a MAC transaction, e.g., a session for packet transmission. Once on a PTCH, the mobile station enters an active mode 101 and the network schedules resources for the specific mobile to complete the MAC transaction in a reserved access mode.

When the mobile has completed the MAC transaction and a configurable inactivity timer, typically residing in the mobile station, expires (generally after 1 second of inactivity), the mobile station leaves the reserved access mode of the PTCH and returns to camp on the original PCCH and eventually enters a sleep-mode 103. When the mobile station is in a sleep-mode, the mobile station conserves battery life by periodically turning off, and then on, the power of its transceiver such that the PCCH is monitored on a periodic, and not constant, basis.

Upon the reception of additional downlink data from the network, if the mobile station has entered a sleep-mode, the base station will page the mobile station at a designated time slot in order to start a downlink MAC transaction. Alternatively, if the mobile station is not in a sleep-mode, i.e., is still active on the PTCH, the base station will start the MAC transaction at the next available reserved time slot.

Certain user services, e.g., VoIP, include sensitive time constraints over the reserved access channel. That is, delays in the transmission and/or receipt of successive packets can have noticeable and undesirable quality of service (QoS) effects, e.g., on voice quality.

For uplink MAC transactions, the delays in between successive packets can be caused by the mobile station having to wait for the next contention based access opportunity scheduled from the base station. The mobile station must also wait for the response of a requested contention based uplink access until it can utilize all of its capabilities. In addition, collisions may occur upon the contention based access opportunities. That is, if multiple mobile stations try to send MAC requests simultaneously, at least one of the mobiles will cease their request and delay until the next contention based opportunity. This cease and delay procure creates an unpredictable variance in the delay for successive MAC transactions.

For conventional downlink MAC transactions, the inactivity timer can force the mobile station to exit active mode 101 and enter sleep-mode 103. If the time since the last uplink or downlink activity occurred exceeds a predetermined value, i.e., the inactivity timer expires, then the mobile station will enter sleep mode and only monitor certain paging time slots in the superframe phase given by its identity. Once the mobile station enters sleep-mode, the delay until a downlink MAC transaction can be established depends on the time until the next paging opportunity. This delay can be partly avoided by increasing the length of the inactivity timer prior to the initiation of sleep mode. While this technique will reduce the delay between successive packets, it will also increase the rate of battery consumption during the times when the mobile station is receiving non-time critical applications. Furthermore, the demands on bandwidth will be increased which may reduce the capacity of the base station.

At the creation of the uplink MAC transaction, the operator can configure the MAC so that most uplink MAC transactions are created as unbounded transactions. That is, more data from the mobile station application can be added to extend the existing transaction. However, once the data from the mobile station transmit buffers has decreased under a predetermined value, the transaction can no longer be extended. For delay sensitive applications, or premium end-users who desire a high QoS, the delay probabilities described above will influence the next uplink data that needs to be sent.

Therefore, there is a need for a system and method which can mitigate the effects of contention based delay for uplink data taking into account the collision probability and variances in delay. In addition, there is a need for a system and method which overcomes the paging delay for downlink data while still providing a reasonable battery preservation technique without sacrificing delay response time.

For other conventional systems, such as a wireless local area network (WLAN), sleep-mode is used in order to minimize battery consumption by the wireless terminal adapter of the mobile station. However, due to long reactivation times for the entrance and termination of the sleep-mode, the use of sleep-mode may introduce unacceptable delays for real-time applications such as VoIP. The delays for the mobile station are mostly due to collision probability while the delays for the network base stations are mostly due to the paging delays, as well as delays for the required signaling over the air interface prior to the entrance and exit of the sleep-mode. Thus, there exists a need to minimize the battery consumption by a mobile station during real-time applications while also minimizing delay response times.

SUMMARY

The present invention overcomes the above-identified deficiencies in the art by providing a method and system for reducing the delay of the transmission of packet data including storing, by a base station, data associated with a mobile station from a first packet data transaction. A packet for starting a second packet data transaction is received from a mobile station and the base station determines whether or not the packet has been correctly received. The base station correlates at least one field in the packet with the stored data. If the base station is able to identify the mobile station based on the correlation with the stored data, then the base station reserves a resource for transmission of a subsequent packet from the mobile station regardless of whether or not the packet has been correctly received.

BRIEF DESCRIPTION OF THE DRAWINGS

The above objects and features of the present invention will be more apparent from the following description of the preferred embodiments with reference to the accompanying drawings, wherein.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The exemplary radio communication systems discussed herein are described as using the time division multiple access (TDMA) protocol, in which communication between the base station and the mobile terminals is performed over a number of time slots. However, those skilled in the art will appreciate that the concepts disclosed herein find use in other protocols, including, but not limited to, frequency division multiple access (FDMA), code division multiple access (CDMA), time division duplex (TDD), or some hybrid of any of the above protocols.

Figure 2:
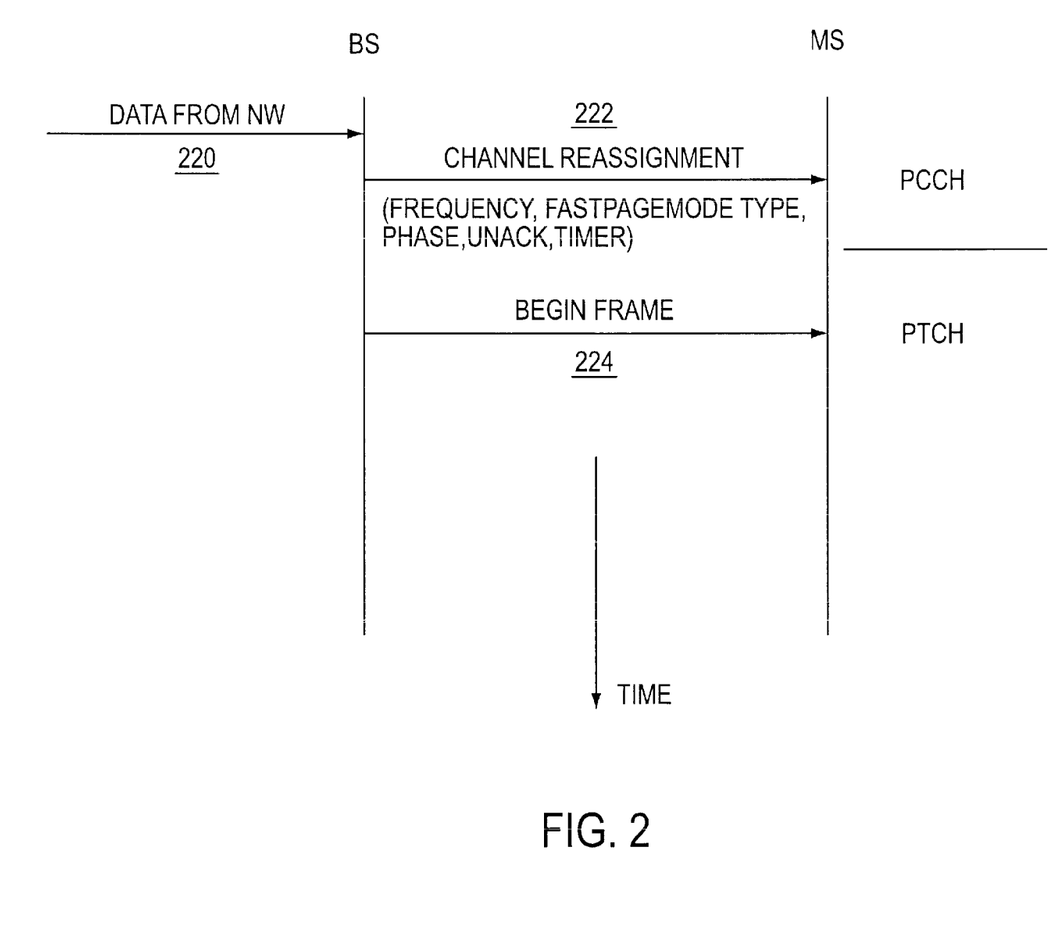
FIG. 2 shows an exemplary signal diagram between a base station and a mobile station of the present invention.

FIG. 2 shows an exemplary signaling diagram between a base station and a mobile station of the present invention. The base station receives data designated for a transmission to a mobile station which includes hard time constraints 220. In an exemplary embodiment of the present invention, the base station or the mobile station determines the hard time constraint for the data designated to the mobile station based upon the service access point (SAP) data which is received from a higher layer, e.g., Layer 1, or additional data which is attached to the data designated to the mobile station. Alternatively, a router, or other lower layer bearer, detects the type of data designated for a transmission and informs the base station, if necessary, of a hard time constraint.

The base station then establishes a MAC transaction by sending a Channel Reassignment message 222 on the PCCH ordering the mobile station to tune to the PTCH. Alternatively, the MAC transaction may occur on the PCCH depending on the traffic load on the PTCH and amount of data designated for the transmission. In this example, the decision to remain of the PCCH for the MAC transaction is made by the scheduling function in the base station. The Channel Reassignment message 222 includes: (1) the frequency of the PTCH; (2) the type of FPM to be used; (3) the phase, i.e. which time slot to use; (4) whether to enter an unacknowledged or acknowledged mode; and (5) an FPM inactivity timer value ($T_2$). The type of fast page mode (FPM) used by the base station refers to the initial periodicity of the uplink and downlink MAC transaction opportunities for the mobile station receiving the Reassignment message. The FPM type also provides the mobile station with information, either explicitly or implicitly, regarding the manner in which the periodicity of transmit opportunities varies as a function of the inactivity time after the latest receipt/transmission of packets. Those skilled in the art will appreciate that there are a number of ways in which this scheme can be implemented. For example, the FPM field in the Reassignment message could have a value of 1–4. Each of these values could be mapped to a storage area within the mobile station which contains both an initial periodicity and a formula or look-up table for calculating the variable periodicity as a function of inactivity time. In addition, those skilled in the art will appreciate that messages other than the Reassignment message may be used to inform the mobile of the FPM characteristics. The message may be appended to an existing message transmitted to the mobile station or the message may be sent explicitly.

Figure 3:
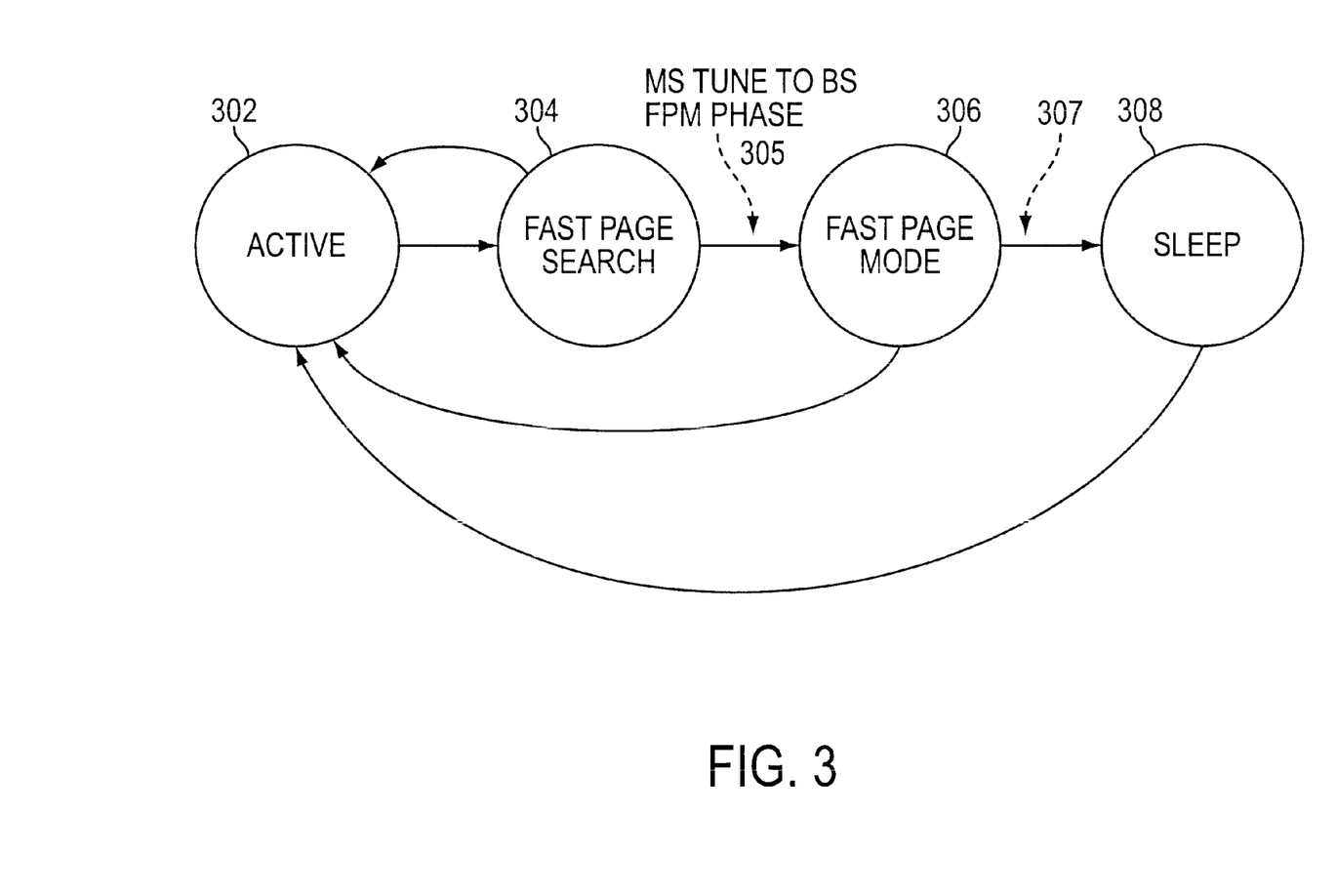
FIG. 3 illustrates a state diagram for a mobile station for an exemplary embodiment of the present invention.

FIG. 3 illustrates a state diagram for a mobile station for an exemplary embodiment of the present invention. Upon receiving the Reassignment message, including an FPM type, that indicates a request to establish a MAC transaction based either on uplink data from the mobile station or downlink data from the network with a quality of service (QoS) which has a hard time constraint, e.g., which is delay sensitive, the mobile station enters an active mode 302. In this exemplary embodiment, during the active mode 302, the mobile station is tuned to the Packet Traffic Channel (PTCH) to send and/or receive packet data. At the expiration of a first inactivity timer ($T_1$), e.g., after one second of inactivity, the mobile station remains on the PTCH and seeks to enter the FPM 306.

In order to ensure that the mobile station and the base station are synchronized in fast page mode, a fast page search mode 304 is initiated prior to entering the FPM state 306. The mobile station monitors the downlink data when in fast page search mode in order to synchronize to the base station FPM phase. An exemplary method for synchronizing the mobile station FPM with the base station FPM is to require the mobile station to detect a predetermined number of FPM downlink signals sent by the base station. Another exemplary method for synchronizing the mobile station FPM with the base station FPM is to explicitly code an FPM identifier into the downlink frame transmitted by the base station. Then, when the mobile station reads the FPM identifier in a downlink burst associated with its FPM type, it will have synchronized to the base station.

Once the mobile station synchronizes to the base station's FPM phase, the mobile station enters the FPM state 306. For fast page search mode 304, if the mobile station has uplink data to send to the base station or if the mobile station detects data destined to the mobile station, then the mobile station is returned to the active mode 302. In FPM 308, once the base station has scheduled the mobile station for a MAC transaction, the mobile station is also returned to active mode 302.

During the FPM state, the mobile station monitors the downlink time slot with a predetermined variable periodicity as indicated by the FPM type. The base station can then send pending downlink data (if any exists) to the mobile station on the predetermined time slots without the need for time-consuming page procedures for the establishment of a MAC transaction. The mobile station monitors the predetermined FPM time slots in order to receive the downlink data from the base station. The base station utilizes the same predetermined variable periodicity as the mobile station and will schedule the mobile station for uplink data transactions without the need for contention based access attempts of the mobile station for the establishment of a MAC transaction. The mobile station or base station can establish subsequent MAC transactions by simply sending a Begin frame during the predetermined time slot which it will identify using the variable periodicity indicated by its assigned FPM type and the measured inactivity. Once either an uplink or downlink MAC transaction is established, the mobile station returns to the active mode 302.

While the mobile station is in FPM 306, if the FPM inactivity timer ($T_2$) expires 307, e.g., after 30 seconds, then the mobile station will enter a conventional sleep-mode 308. During sleep-mode 308, if the mobile station detects a request to establish a MAC transaction based either upon uplink data from the mobile station or downlink data from the network, then the mobile station will re-enter the active mode 302.

Figure 4:
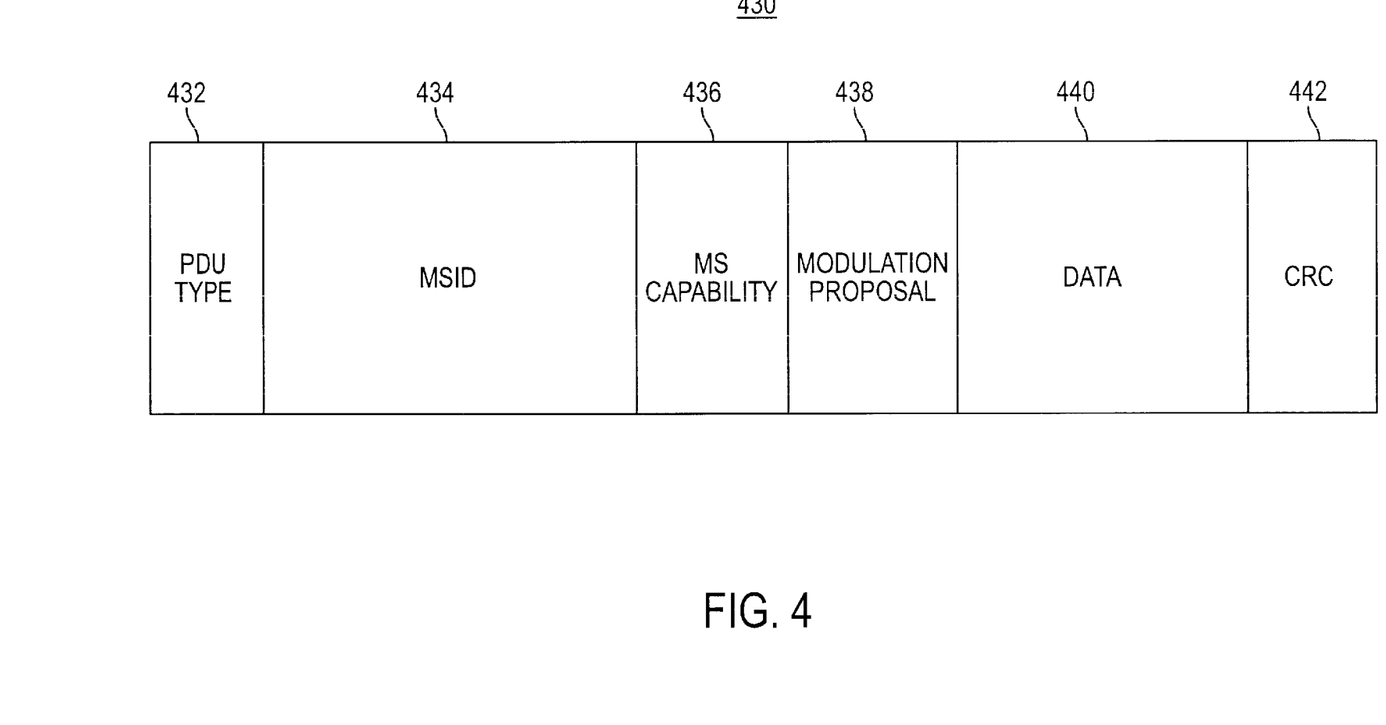
FIG. 4 illustrates an exemplary data packet transmitted from a mobile station to a base station.

An exemplary data packet 430 sent from the mobile station, in response to an transmit opportunity indication by the base station during fast page mode, is illustrated in FIG. 4. The data packet comprises a packet data unit (PDU) type field 432, a mobile station identification number (MSID) field 434, a mobile station capability field 436, a modulation proposal field 438, a data field 440, and a cyclic redundancy code (CRC) field 442. The PDU type field 432 is used to identify the type of packet being sent by the mobile, e.g., a Begin frame. The MSID field 434 is used to carry a unique code of a predetermined length, e.g., 32 bits, to identify the mobile station. The mobile station capability field 436 is used to indicate to the base station the number of slots per frame on which the mobile station is capable of transmitting and receiving. The modulation proposal field 438 is used to propose to the base station the preferred modulation technique, e.g., BPSK or QPSK, used by the mobile station. The data field 440 is used to carry the payload data from the mobile station and the CRC field 442 is the checksum used by the base station to verify the contents of the packet 430.

Figure 5:
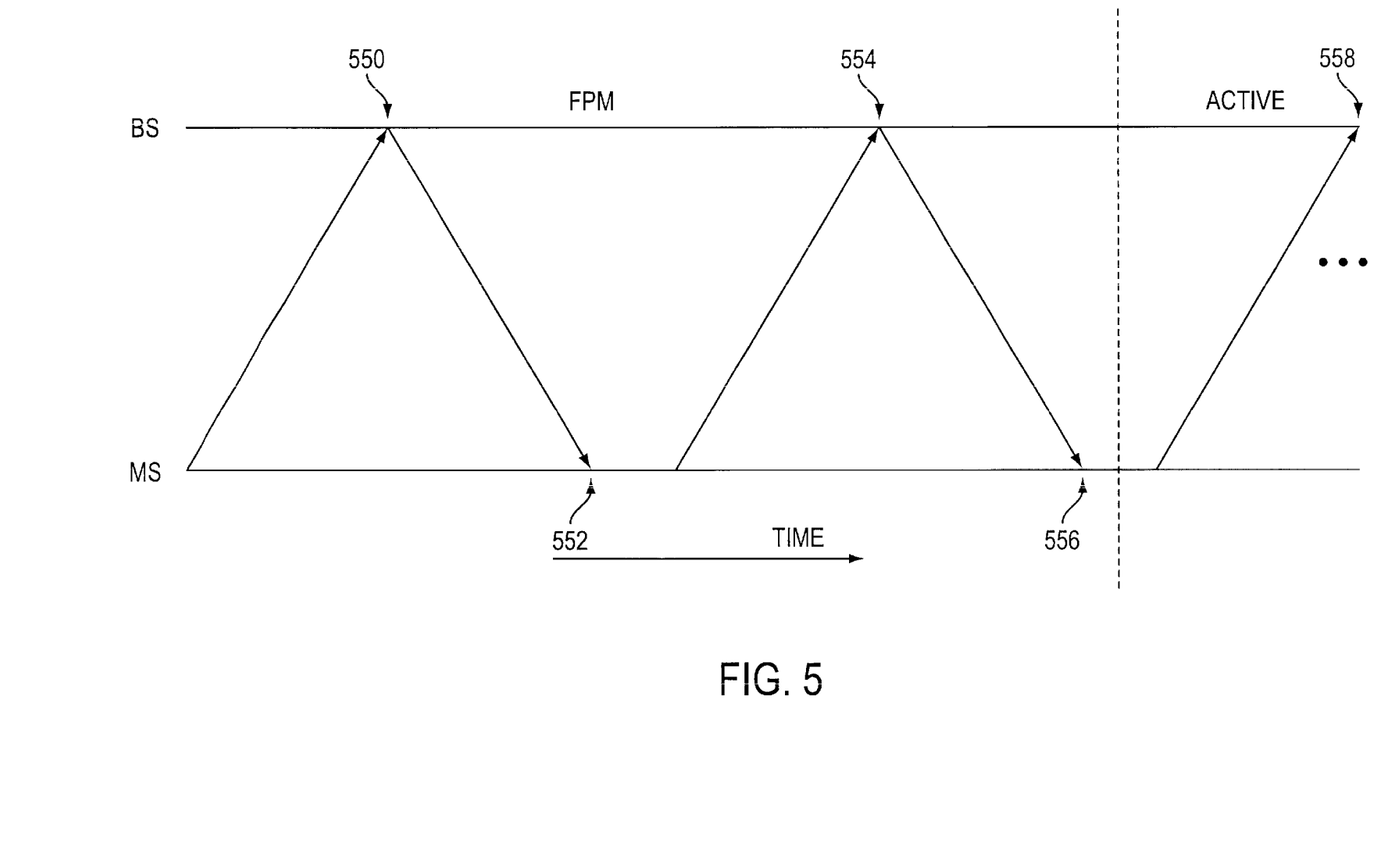
FIG. 5 illustrates an exemplary signal diagram between a base station and a mobile station.

FIG. 5 illustrates an exemplary signal diagram between the base station and the mobile station operating in FPM. The base station (BS) has reserved predetermined uplink and downlink time slots for the mobile station (MS) as transmission opportunities with a predetermined periodicity. When the mobile station has uplink data to send to the base station, it sends, at its scheduled uplink time slot, a signal 550 containing packet 430 (see FIG. 4) indicating in the PDU type field 432 that the packet is a Begin frame. The base station uses the value of the CRC field 442 to verify the information in the packet.

If the base station cannot verify the information in the packet, the base station sends a non-acknowledgment message 552 to the mobile station. At the next scheduled opportunity in FPM, the mobile station will retransmit 554 the packet 430. If, after retransmission the packet is verified, then the base station returns an acknowledgment message 556, receives the first data field 440, and receives the remaining packets in active mode (illustrated as signal 558).

A decay in the QoS of a communication may occur in the case where the mobile station must wait until the next scheduled opportunity to retransmit its Begin frame. However, in an alternate embodiment of the present invention, this potential decay can be mitigated by taking advantage of the structure of the packet 430. For example, for a given mobile station, at least one of, and possibly all of the MSID field 434, mobile station capability field 436, and modulation proposal field 438 have the same value for each packet sent by the same mobile station.

The base station therefore, can store these known values from an earlier communication (a previous active mode communication or a request from the mobile station to enter FPM) with the mobile station in order to anticipate the above-mentioned fields for future communications. In addition, if the base station is anticipating a Begin frame from the mobile station (e.g., during FPM), then when the mobile station sends the Begin frame, the PDU type field 432 is also known by the base station.

The present invention takes advantage of the base station's ability to anticipate the values of the fields which precede the data field 440 so that the base station can correlate the received known packet field values with stored values from a previous communication with the mobile station. In this way, even if the CRC fails and the data cannot be reliably decoded, if the base station was able to correlate the values received in one or more of, for example, fields 432, 434, 436 and 438 from a previous transaction, then the base station would know that the specific mobile station attempted to establish a MAC transaction. One skilled in the art will recognize that the base station can correlate to any combination or portion of the fields 432–438 to identify the packet's originator. However, the accuracy of the correlation will be dependent on the number of bits correlated.

An exemplary method of correlating the packet fields is to perform a bit by bit comparison of the received data. If a predetermined number of bits match, then the base station can assume that the two packet fields match. One skilled in the art will recognize that the percentage of bits required for a match is dependent on the desired tolerance of the system which may, for example, be based on the total number of mobile stations and/or the length of the packet fields.

Figure 6:
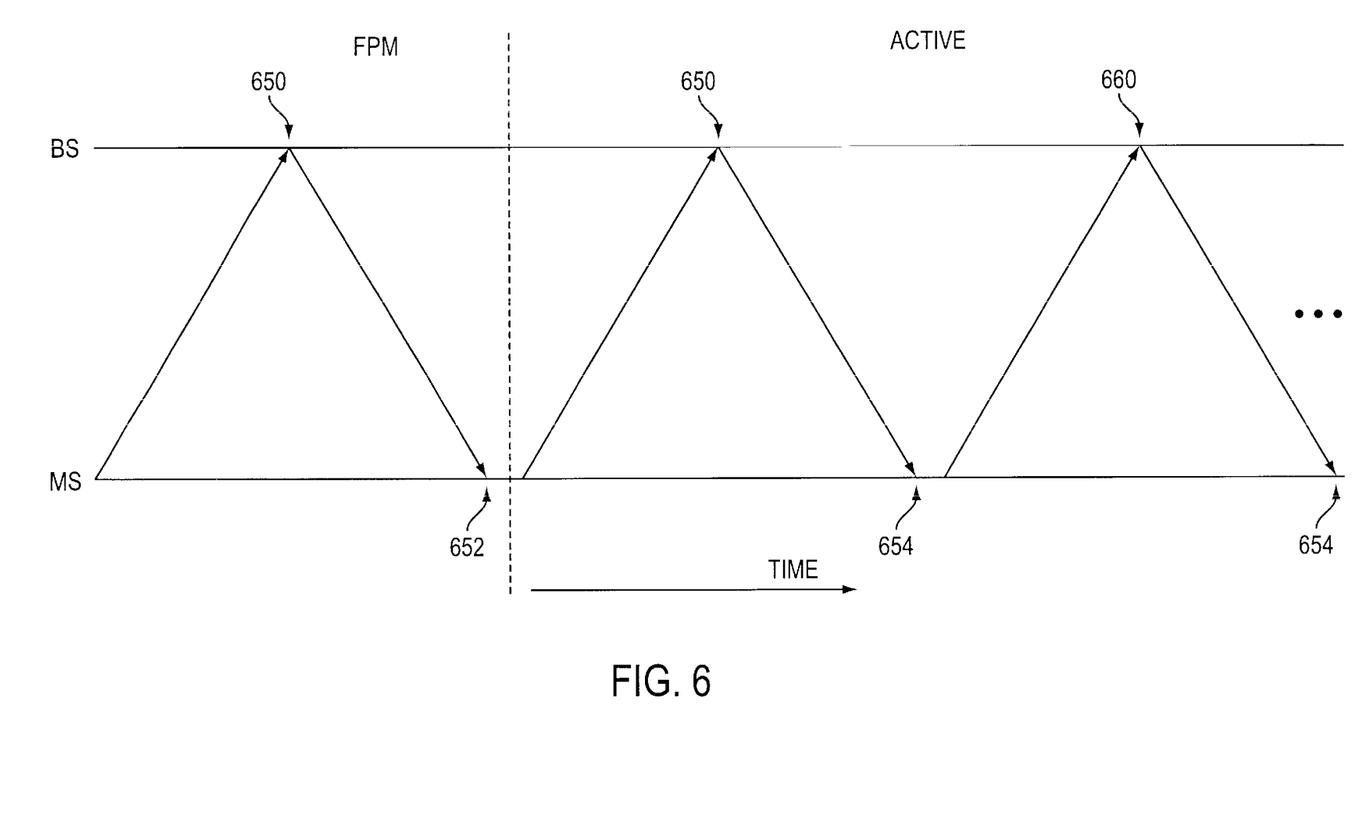
FIG. 6 illustrates an exemplary signal diagram between a base station and a mobile station of the present invention.

FIG. 6 illustrates an exemplary signal diagram between a base station and a mobile station applying the above technique. The base station (BS) has reserved predetermined uplink and downlink time slots for the mobile station (MS) as transmission opportunities with a predetermined periodicity. When the mobile station has uplink data to send to the base station, it sends at its scheduled uplink time slot, a signal 650 containing packet 430 (see FIG. 4) indicating in the PDU type field 432 that the packet is a Begin frame. The base station uses the value of the CRC frame 442 to verify the information in the packet.

In an exemplary embodiment of the present invention, if the base station cannot verify the information in the packet, the base station sends a non-acknowledgment message 652 to the mobile station. However, in this case, since the base station has reserved this opportunity for the mobile station, it assumes that the communication received, even if it the data cannot be decoded, is from the mobile station. The base station then attempts to correlate the stored values of the MSID, PDU Type, MS Capability, and Modulation Proposal frames (432–438) with the received values from the signal 650. If the base station is able to correlate the above values, then the base station schedules the mobile station to retransmit the data in active mode, rather than waiting to receive another Begin frame in FPM. Allowing the mobile station to enter active mode without having to wait for the next reserved time slot in FPM reduces the delay for the transmission of the packet, thereby providing a higher QoS. The mobile station resends the Begin frame signal 650 at the newly scheduled time slot and the base station acknowledges the receipt of the signal with an acknowledgment signal 654. The remaining packets are subsequently sent and acknowledged (represented by signals 660 and 654, respectively) in active mode.

In an alternate embodiment of the present invention, the mobile station sends the Begin frame in response to a signal from the base station including the mobile station identification number indicating the occurrence of an uplink scheduling opportunity for the mobile station. Furthermore, while the above-described embodiments were provided using FPM as an exemplary protocol for the present invention, one skilled in the art will appreciate that the present invention may be practiced under numerous wireless communication protocols. For example, the signal from the base station may be sent to the mobile station while the mobile station is in active mode, FPM, or sleep mode.

The foregoing has described the principles, preferred embodiments and modes of operation of the present invention. However, the invention should not be construed as being limited to the particular embodiments discussed above. While the above-described embodiments were provided using TDMA, one skilled in the art will appreciate that the present invention may be practiced in any of a number of different protocols such as CDMA, FDMA, TDD, etc. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method for transmitting packet data in a radiocommunication system comprising the steps of:

storing, by a base station, data associated with a mobile station from a first packet data transaction;

receiving, from said mobile station, a packet for starting a second packet data transaction;

determining, by said base station, whether said packet has been correctly received;

correlating said stored data with at least one field in said packet; and reserving, by said base station, a resource for transmission of at least one subsequent packet from said mobile station regardless of whether said packet has been correctly received if said step of correlating verifies an identity of said mobile station.

2. The method of claim 1, wherein said step of storing data stored a mobile identification number field.

3. The method of claim 1, wherein said step of determining is based on a checksum value.

4. The method of claim 1, wherein step of reserving said resource assigns at least one time slot.

5. The method of claim 1, wherein said step of receiving receives said packet during a fast page mode time slot.

6. The method of claim 1, said method further comprising the step of:

transmitting, by said base station, a transmission opportunity message to said mobile station, wherein said packet from said mobile station is received in response to said transmission opportunity message.

7. The method of claim 6, wherein said transmitting step transmits said transmission opportunity message in an active mode.

8. The method of claim 6, wherein said transmitting step transmits said transmission opportunity message in a fast page mode.

9. The method of claim 6, wherein said transmitting step transmits said transmission opportunity message while said mobile station is in a sleep mode.

10. A method for reducing the delay of the transmission of packet data comprising:

receiving a packet, said packet including a first portion, a second portion, and a packet type field said second portion including a checksum;

decoding the contents of the packet;

verifying the accuracy of the contents based on said checksum;

comparing said first portion of said packet with a stored portion if said verifying step indicates an error in the decoding step; and assigning a time slot for the receipt of an additional packet if said first portion matches said stored portion.

11. The method of claim 10, wherein said first portion and said stored portion include a mobile identification number field.

12. The method of claim 10, wherein said first portion and said stored portion include at least one of a mobile station capability field and a modulation proposal field.

13. The method of claim 10, wherein said comparing step compares said first portion and said packet data field with said stored portion.

14. The method of claim 10, wherein said packet is received in a first mode and wherein said time slot is assigned for a second mode.

15. The method of claim 14, wherein said first mode is a fast page mode and wherein said second mode is an active mode.

16. The method of claim 10, wherein said first portion and said stored portion each comprise a predetermined number of bits, said comparing step further comprising:

comparing each bit of said first portion with said second portion, indicating that said first portion matches said second portion if a respective predetermined number of bits match from said first portion and said second portion.

17. A base station comprising:

a transceiver for receiving a data packet from a mobile station, said data packet including a first portion, a second portion, and a packet type field;

decoding the means for decoding contents of the packet;

verifying means for verifying the accuracy of the contents based on a checksum; and a processor for comparing said first portion of said data packet with a stored portion if said verifying means indicates an error in the decoding of the packet contents, wherein said processor assigns a time slot for the receipt of an additional packet if said first portion matches said stored portion.

18. The base station of claim 17, wherein said first portion and said stored portion comprise a mobile identification number field.

19. The base station of claim 17, wherein said first portion and said stored portion comprise at least one of a mobile station capability field and a modulation proposal field.

20. The base station of claim 17, wherein said processor compares said packet type field and said first portion with said stored portion.

21. The base station of claim 17, wherein said second portion includes a checksum.

* * * * *

UNITED STATES PATENT AND TRADEMARK OFFICE
CERTIFICATE OF CORRECTION

PATENT NO. : 6,519,469 B1  Page 1 of 1
DATED : February 11, 2003
INVENTOR(S) : Rydnell et al.

It is certified that error appears in the above-identified patent and that said Letters Patent is hereby corrected as shown below:

<u>Column 10,</u>
Line 23, insert -- said second portion including a checksum -- after "field"
Line 24, remove "the" after "decoding" and before "means" insert -- the -- after "decoding" and before "contents"
Line 26, remove "a" replace with -- said --

Signed and Sealed this

Seventeenth Day of February, 2004

JON W. DUDAS
*Acting Director of the United States Patent and Trademark Office*